United States Patent
Pau et al.

(10) Patent No.: US 7,254,174 B2
(45) Date of Patent: Aug. 7, 2007

(54) PROCESS FOR CHANGING THE RESOLUTION OF MPEG BITSTREAMS, AND A SYSTEM AND A COMPUTER PROGRAM PRODUCT THEREFOR

(75) Inventors: Danilo Pau, Sesto San Giovanni (IT); Daniele Alfonso, Monza (IT); Fabrizio Basso, Iglesias (IT); Emiliano Piccinelli, Monza (IT); Alessandro Cremonesi, S. Angelo Lodigiano (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 672 days.

(21) Appl. No.: 10/075,087

(22) Filed: Feb. 11, 2002

(65) Prior Publication Data

US 2002/0186774 A1  Dec. 12, 2002

(30) Foreign Application Priority Data

Feb. 9, 2001 (EP) ................................. 01830084
Mar. 30, 2001 (EP) ................................ 01830227

(51) Int. Cl.
*H04N 7/12* (2006.01)
*H04N 11/02* (2006.01)
(52) U.S. Cl. ........................ 375/240.01; 375/240.21
(58) Field of Classification Search .......... 375/240.16, 375/240.01, 240.21; 382/250, 299
See application file for complete search history.

(56) References Cited

U.S. PATENT DOCUMENTS

| 5,144,424 A | * | 9/1992 | Savatier ................. 375/240.03 |
| 5,675,387 A | * | 10/1997 | Hoogenboom et al. 375/240.15 |
| 5,724,475 A | * | 3/1998 | Kirsten ........................ 386/109 |
| 5,748,240 A | * | 5/1998 | Carr et al. ............. 375/240.01 |
| 5,920,353 A | * | 7/1999 | Diaz et al. ............. 375/240.15 |
| 5,926,573 A | * | 7/1999 | Kim et al. ................... 382/239 |

(Continued)

FOREIGN PATENT DOCUMENTS

WO  WO 00/21300  4/2000

(Continued)

OTHER PUBLICATIONS

Adaptive motion-vector resampling for compressed video downscaling; Shen et al.;Circuits and Systems for Video Technology, IEEE Transactions on vol. 9, Issue 6, Sep. 1999 pp. 929-936; Digital Object Identifier 10.1109/76.785730 □□.*

(Continued)

*Primary Examiner*—Gims Philippe
*Assistant Examiner*—Erick Rekstad
(74) *Attorney, Agent, or Firm*—Lisa K. Jorgenson; Robert Iannucci; Seed IP Law Group PLLC (57) ABSTRACT

A process and a system is described for generating an MPEG output bitstream starting from an MPEG input bitstream. The output bitstream has a resolution modified with respect to the resolution of the input bitstream. In the input bitstream, first portions that substantially do not affect and second portions that do affect resolution variation are distinguished. The second portions are then subjected to a function of modification of the resolution obtained by filtering the second portions in a domain of the discrete cosine transform, and then are transferred to the output bitstream. A corresponding computer program product is also provided.

31 Claims, 6 Drawing Sheets

U.S. PATENT DOCUMENTS

| | | | |
|---|---|---|---|
| 6,058,143 A * | 5/2000 | Golin | 375/240.16 |
| 6,181,711 B1 * | 1/2001 | Zhang et al. | 370/468 |
| 6,259,741 B1 * | 7/2001 | Chen et al. | 375/240.26 |
| 6,445,828 B1 * | 9/2002 | Yim | 382/250 |
| 6,498,965 B2 * | 12/2002 | Matsumoto et al. | 700/231 |
| 6,590,938 B1 * | 7/2003 | Azadegan et al. | 375/240.21 |
| 6,647,061 B1 * | 11/2003 | Panusopone et al. | 375/240.12 |
| 2002/0003838 A1 * | 1/2002 | Takahashi et al. | 375/240.21 |
| 2002/0196853 A1 * | 12/2002 | Liang et al. | 375/240.16 |

FOREIGN PATENT DOCUMENTS

WO WO 00/51357 8/2000

OTHER PUBLICATIONS

Zhu, W. et al., "CIF-to-QCIF Video Bitstream Down-Conversion in the DCT Domain," *Bell Labs Technical Journal*, 3(3):21-29, Jul.-Sep. 1998.

* cited by examiner

PROCESS FOR CHANGING THE RESOLUTION OF MPEG BITSTREAMS, AND A SYSTEM AND A COMPUTER PROGRAM PRODUCT THEREFOR

BACKGROUND OF THE INVENTION

1. Field of the Invention

The present invention relates to the processing of bitstreams encoded according to the MPEG standard.

The MPEG (Moving Pictures Experts Group) standard proposes a set of algorithms dedicated to the compression of sequences of digital (audio/video) signals. The subject of the specification does not regard so much the use of these tools in the encoding phase as rather the way of interpreting the syntax of the encoded bitstream and the use of said tools during decoding (i.e., when carrying out decompression). The techniques used are based on the reduction in spatial and temporal redundancy of the sequence.

2. Description of the Related Art

In general, according to the MPEG standard, reduction in spatial redundancy is obtained by independently compressing the individual images, using a discrete cosine transform (DCT), quantization and Huffman coding.

Reduction in temporal redundancy is obtained by exploiting the correlation that exists between successive and/or temporally close images in the sequence. Approximately it is assumed that each portion of an image could be expressed locally as the translation of a portion of a previous and/or subsequent image in the sequence.

For this purpose, the MPEG standard reviews three types of images indicated by I (Intra-Coded Frame), P (Predicted Frame), and B (Bidirectionally Predicted Frame).

The images I are encoded in an altogether independent way; the images P are encoded with respect to a previous image I or P in the sequence; finally, the images B are encoded with respect to two images of an I type or P type, one preceding and the other following in the sequence.

A typical succession of images may be as follows: IBBPBBPBBIB . . .

This is the order in which the images are displayed, but since each image P is encoded with respect to the preceding image I or P, and each image B is encoded with respect to the preceding and following image I or P, it is necessary for the decoder to receive the images P before the image B, and the images I before the image P. Consequently, the order of transmission of the images will be IPBBPBBIBB . . .

The images are processed by the encoder in a sequential way in the order indicated, and subsequently sent to a decoder which decodes them and re-orders them, so enabling their subsequent display. To encode an image B it is necessary for the encoder to maintain the images I and P—encoded and then decoded previously—to which the image B refers, in a special memory referred to as "frame memory", and this operation requires an appropriate amount of memory.

The above methodology finds a valid example of implementation in the MPEG 2 and MPEG 4 standards.

Figure 1:
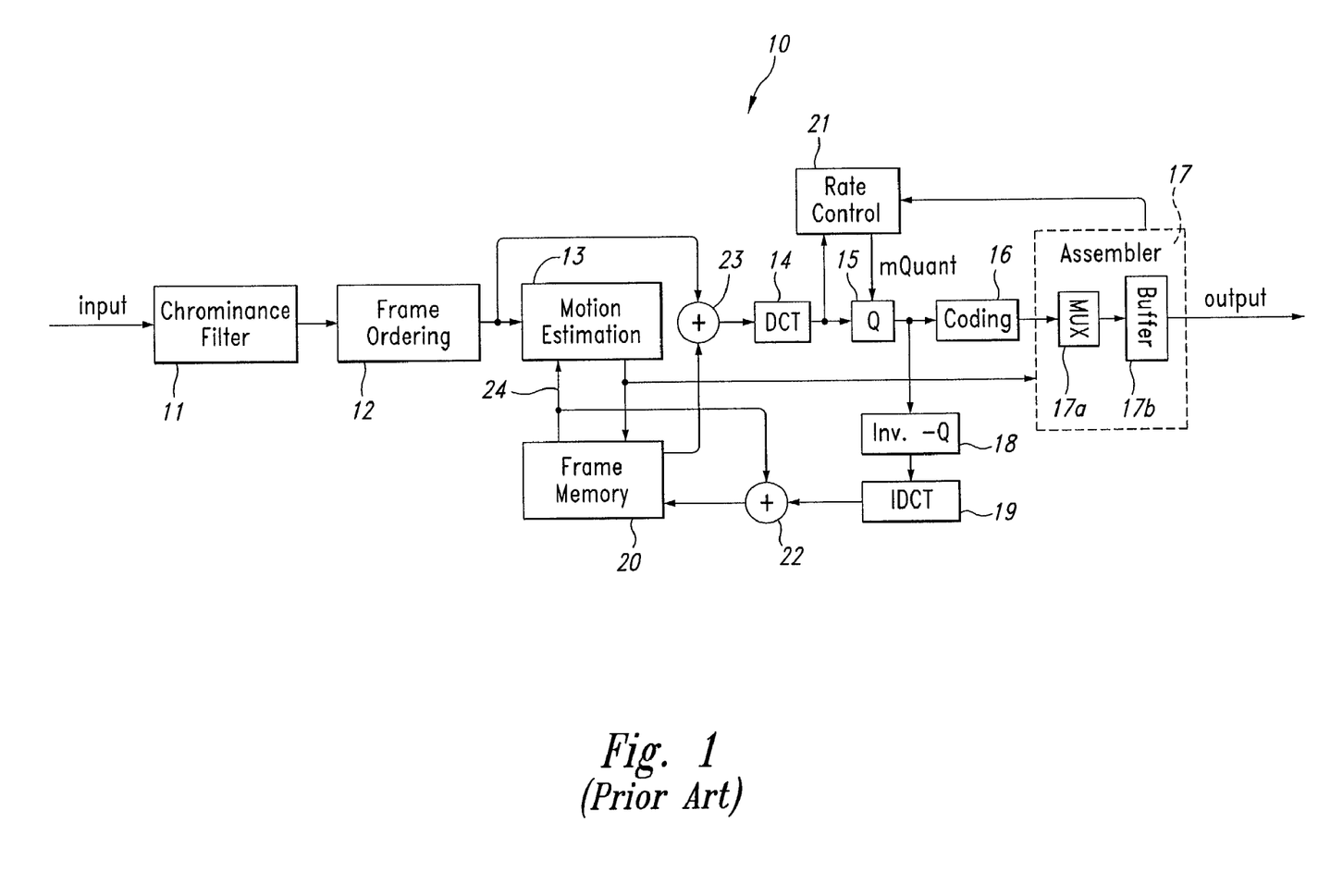

In this connection, the diagram of FIG. 1 illustrates, in the form of a block diagram, the typical structure of a video MPEG encoder.

The system, designated as a whole by 10, comprises, in the first place, a module 11 designed to carry out filtering of the chrominance (chroma) component of the video signal passing from the format 4:2:2 to the format 4:2:0. Basically, the module 11 contains a lowpass filter which operates on the chrominance component, replacing each pixel with a weighted sum of the surrounding pixels that are set on the same column multiplied by appropriate coefficients. This enables the subsequent sub-sampling by two to obtain a halved vertical definition of the chrominance.

The reference number 12 designates a frame-ordering module made up of one or more frame memories. The module 12 is designed to supply at output the frames in the encoding order required by the syntax of the MPEG standard.

For example, if the input sequence is IBBPBBP, etc., the order at output will be IPBBPBB . . .

As has already been explained, I (Intra-Coded Picture) is a frame and/or a half-frame containing temporal redundancy; P (Predicted Picture) is a frame and/or a half-frame the temporal redundancy of which with respect to a preceding image I or P (which has been previously encoded/decoded) has been removed; by B (Bidirectionally Predicted Picture) a frame and/or half-frame is indicated the temporal redundancy of which with respect to the preceding image I and the subsequent image P (or else, the preceding image P and the subsequent image P, or again, the preceding image P and the subsequent image I) has been removed. In both cases, the images I and P are to be considered already encoded/decoded.

The reference number 13 designates the module for estimating motion, i.e., the block that is able to remove the temporal redundancy of the images P and B.

It is to be recalled that the above block works only on the most energetic component (and hence one that is rich in information) of the images that make up the sequence to be encoded, such as the luminance sequence.

One of the important concepts for carrying out encoding is the estimation of the motion, and the MPEG standard is based upon the considerations specified below.

A set of pixels of an image frame may be set in a position of the subsequent image obtained by translation of the image in the previous frame.

Suppose, for example, that this set of pixels is a square of 16×16 pixels. This set of data, together with the color information associated to it, is usually referred to as "macroblock".

Of course, the changes in position of the objects may expose to the filming camera parts that were previously not seen, as well as modifications in the shapes of the objects themselves (for example, as a result of a zooming function, etc.).

The family of algorithms that are able to identify and associate the said portions of images is referred to as "estimation of motion". This association makes it possible to calculate the portion of difference image, thus removing the redundant temporal information and rendering the subsequent process of compression by means of a DCT, quantization and entropic encoding more effective.

The reference number 14 designates a module or block that implements, on the signal coming from an adder node 23 (which will be explained in greater detail later), the DCT according to the MPEG standard. The image I and the images P and B, considered as error images, are divided into 8×8 blocks Y, U, V, on which DCT transformation is applied.

The reference number 15 designates a quantizer module. Here the 8×8 block resulting from DCT transformation is divided by a matrix, referred to as "quantization matrix", such as to reduce, more or less drastically, the dimension in number of bits of the DCT coefficients. In this case, the tendency is to remove the information associated to the higher frequencies which are less visible to the human eye. The result is re-ordered and sent to the subsequent block, designated by 16, which implements the run-length coding (RLC) and the variable-length coding (VLC).

In particular, RLC aims at taking into account the fact that the code words at output from the quantizer module 15 tend to contain zero coefficients in a more or less high number, followed by non-zero values. The zero values which precede the first non-zero value are counted, and this count constitutes the first portion of a word, the second portion of which is the non-zero coefficient. This method of packeting data is defined as "run-length coding".

The result thus obtained undergoes variable-length coding (VLC), also known as Huffman coding.

This type of coding takes into account the fact that some pairs of values tend to assume more likely values than others. The more likely values are coded with very short words (2/3/4 bits), whereas the less likely values are coded with longer words. Statistically, the number of bits produced at output is smaller than the number of bits at input, or rather the number of bits that there would be if the said coding were not carried out.

In order to be able to construct the final syntax envisaged by the MPEG standard, the data generated by the variable-length encoder (output from the module 16), the quantization matrices, the vectors of motion (output from the module 13), and other syntactic elements are sent to an assembler module, designated as a whole by 17 and comprising a multiplexer 17a and a buffer 17b.

The limit size of the buffer is specified by the standard itself and cannot be exceeded.

The quantization block 15 presides over respect of the said limit, rendering more or less drastic the process of division of the DCT coefficients according to whether the latter are more or less close to filling the buffer and according to the energy of the 8×8 source block taken upstream of the process of estimation of motion and DCT transformation.

The reference numbers 18 and 19 designate two modules that basically implement a feedback loop to the estimation-of-motion function represented by the module 13.

In particular, the module designated by 18 performs on the data undergoing quantization in the module 15 an inverse-quantization function.

The signals thus obtained undergo inverse DCT (IDCT) in the module 19. In practice, the DCT function is inverted and applied to the 8×8 block at output from the process of inverse quantization. The function performed in the module 19 enables passage from the domain of spatial frequencies to the pixel domain, obtaining at output:

the decoded frame (half-frame) I that is to be stored in an appropriate frame memory for subsequent removal of temporal redundancy, with respect thereto, from the subsequent images P and B; and the decoded prediction error frame (half-frame) P and B which is added to the information previously removed during the step of estimation of motion; in the P case, this resulting sum, stored in an appropriate frame memory, is used during the process of estimation of motion for the subsequent images P and B.

The above is performed in the module designated, as a whole, by 20, where the frame memories are usually distinct from the re-ordering memories.

The reference number 21 designates the rate-control module which interacts for this purpose with the output of the module 14 and the output of the buffer 17b, supplying a corresponding control signal mQuant to the module 15.

Finally, the reference numbers 22 and 23 designate two adder nodes in which the following are respectively added:

the output of the IDCT module 19 and the output, designated by 24, on which the data relating to the motion vectors are transferred from the module 20 to the estimation-of-motion module 13; and the output of the re-ordering module 12 and the output of the module 20, and this in view of supply to the module 14 which implements the DCT function.

The foregoing obviously corresponds to altogether current know-how for persons skilled in the sector, a know-how which is here recalled merely for purposes of reference.

Figure 2:
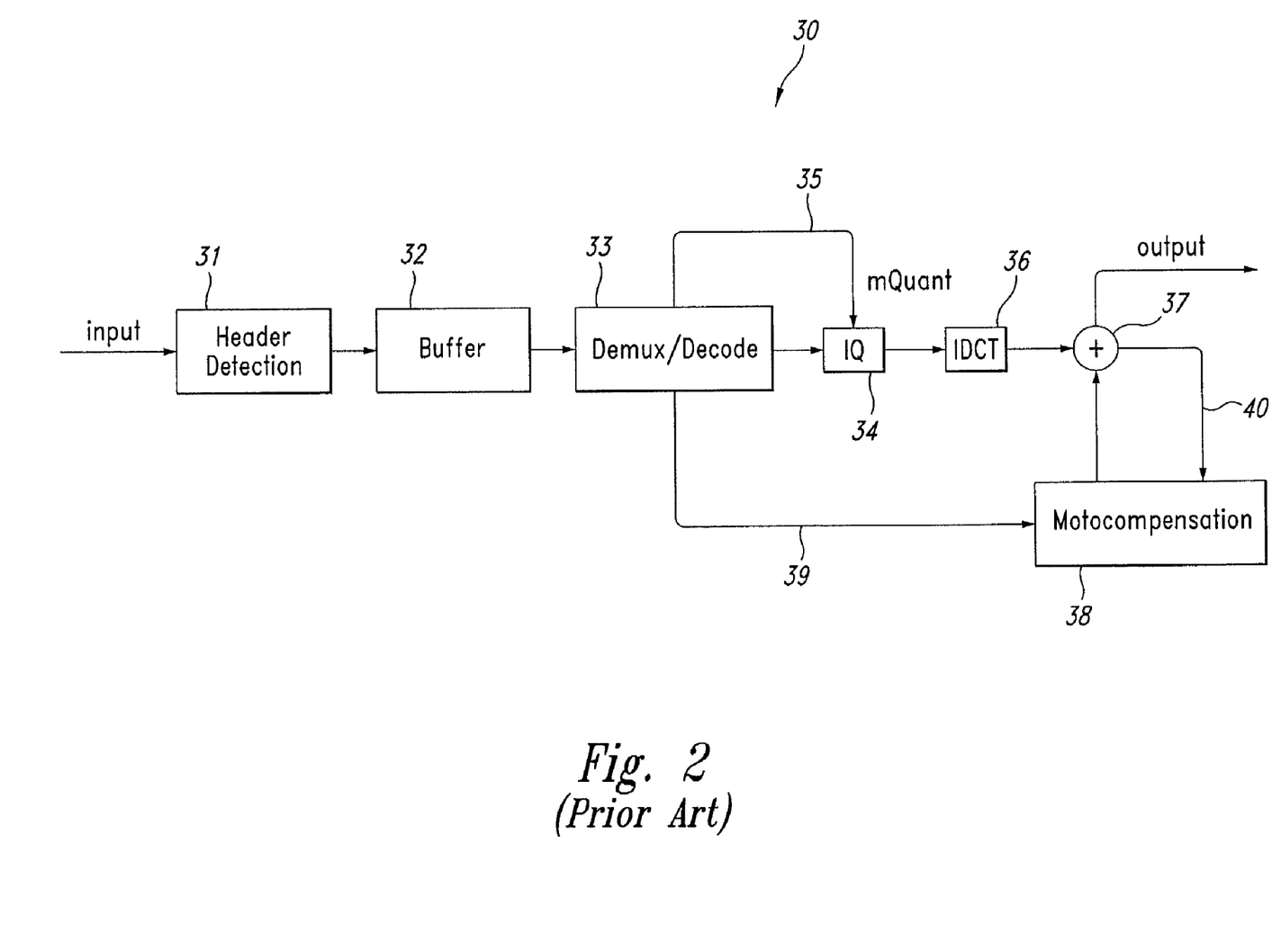

The same also applies to the structure of an MPEG decoder as represented in FIG. 2.

In the above-mentioned figure it is possible to note that the said demodulator, designated as a whole by 30, in the first place carries out, in a module designated by 31, detection of the so-called "headers" in the framework of the MPEG-encoded bitstream and the subsequent accumulation of the data received within a buffer 32 designed to absorb any discontinuities in the said stream.

The module 33 is responsible for performing the functions of demultiplexing, inverse VLC decoding, and inverse decoding of the run-level pairs in view of forwarding of the data thus obtained to a module 34. Here, under the control of the signal mQuant supplied by the module 33 itself on a line 35, the inverse-quantization function is performed.

The signal thus obtained is then passed onto to a module 36 which performs the inverse DCT function, the aim being to proceed, in an adder node 37 to reconstruction of the output signal according to the signal generated by the motocompensation node 38 which receives, from the module 33, the data regarding the motion vectors on a line 39. In the node 37 also the prediction error is calculated for decoding the subsequent images P and B (line 40).

It may therefore be stated that the processes illustrated in FIGS. 1 and 2 are two concurrent processes cascaded together.

In the actual use of the MPEG standard it is therefore possible to transmit (or record) films, or, in general, video sequences on a variety of channels and media, each of which has its own characteristics of capacity, speed and cost.

For example, the distribution of a film starting from the master recording may take place on a DVD medium, via satellite, via radio antenna, or via cable.

The band available for transmission may therefore be different from the one envisaged in the step of decoding of the video sequence according to the MPEG standard; or else the bitrate obtained during the step of encoding of the video sequences may be in excess as compared to the bitrate allowed by the transmission channel/recording medium.

Consider, for example, encoding a 6-Mbit/s sequence according to the MPEG 2 standard.

If the attempt were made to use a 384-kbit/s UMTS (third-generation cellphone transmission standard) channel, it would be possible to consider decoding the sequence, returning to the pixel domain, and then re-encode the 384-kbit/s sequence afterwards.

In the case where re-encoding was applied to images having the same spatial resolution as the decoded ones, the quality of the bitstream obtained would be very poor in terms of signal-to-noise ratio.

In addition, the decoder located in the receiving terminal should be able to decode bitstreams in compliance with an MPEG specification containing a different spatial resolution from the one with which the bitstream generated by the first video encoder would comply.

With regard to the MPEG 2 standard and/or the MPEG 4 standard, there thus emerges the problem of dynamic re-adaptation of the resolution of the compressed images into a bitstream encoded in compliance with an MPEG standard.

In order to achieve the above target, it is possible to envisage a procedure according to which the MPEG bitstream is simply decoded, and then the horizontal resolution and vertical resolution are changed by operating in the pixel domain. This could be done, for example, passing from a horizontal and vertical resolution Hor×Vert to a final resolution (Hor/N)×(Vert/M), where N and M are positive fractional integers, then to proceed to the subsequent signal re-encoding which undergoes change of resolution by means of an MPEG encoder.

For example, proceeding as described above, it is possible to have the following cases of change of resolution:

| INITIAL SPATIAL RESOLUTION | FINAL SPATIAL RESOLUTION |
|---|---|
| HDTV (1920 × 1088 or 1920 × 1152) | SDTV_1 (960 × 544 or 960 × 576) → N = M = 2 |
| HDTV (1920 × 1088 or 1920 × 1152) | SDTV_2 (720 × 480 or 720 × 576) → N = 2.67 M = 2.267 or M = 2 |
| CIF (352 × 240 or 352 × 288) | QCIF → N = M = 2 |
| SDTV_2 | CIF → N = M = 2 |
| SDTV | HALF SDTV → N = 2 M = 1 |

Figure 3:
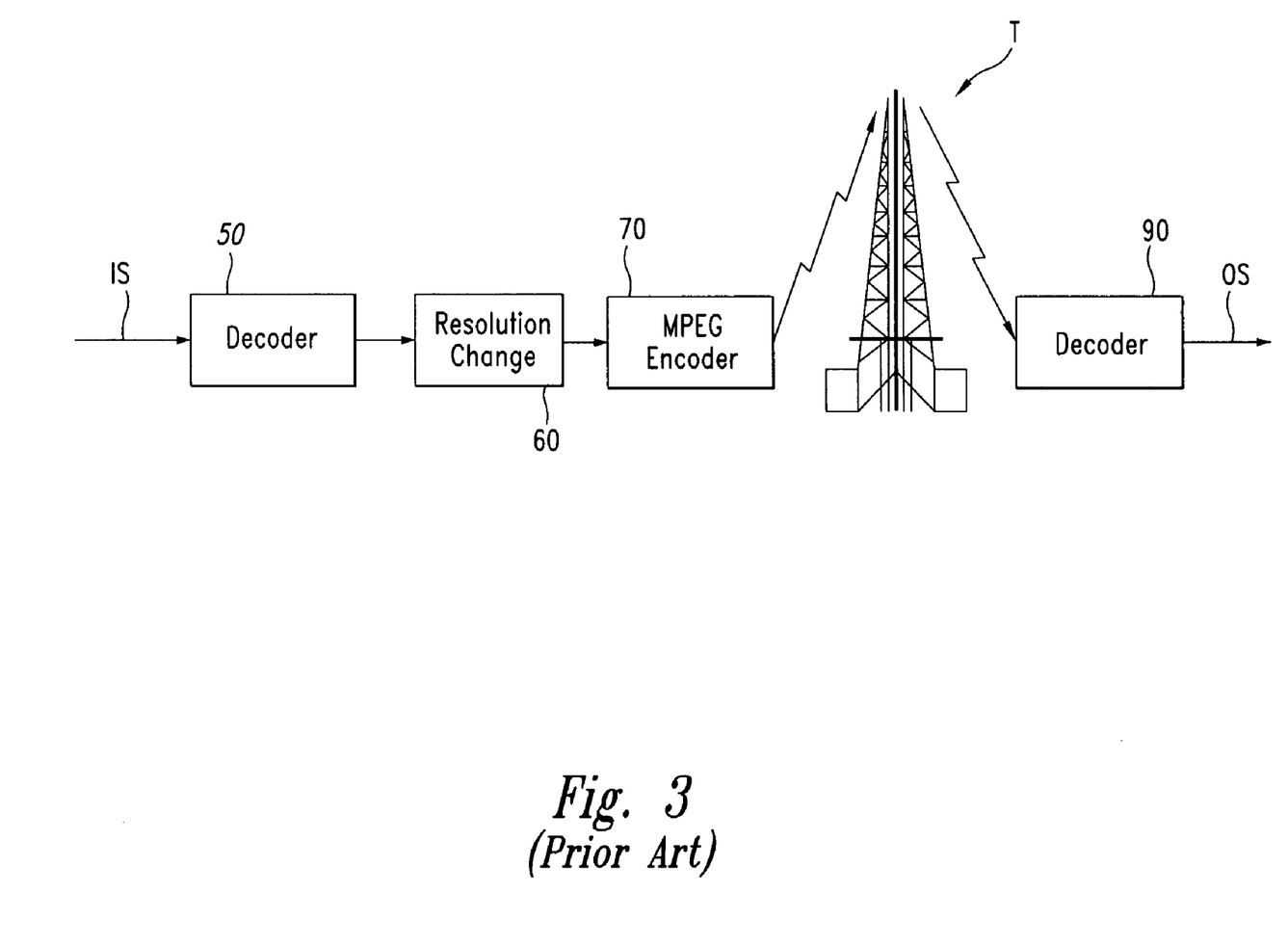

The above solution is in actual fact very complex from a computational point of view, as may be easily understood if reference is made to the diagram of FIG. 3, which is a schematic illustration of a solution based, precisely, on the criterion of obtaining the change of resolution by operating in the pixel domain.

If we assume that we are operating on an input bitstream IS encoded according to the MPEG 2 or MPEG 4 standard, the reference number 50 designates a decoder that performs a transformation of the MPEG bitstream (whether it be the specification 2 or the specification 4 is in itself irrelevant) into decoded images ID with a number of pixels per image equal to Hor×Vert.

The reference number 60 designates a filtering module with downsampling which performs change of resolution bringing said resolution to the value (Hor/N)×(Vert/M).

The said module may be, for example, a module able to perform change of resolution on the basis of a classic technique that uses finite-impulse-response (FIR) filters.

The FIR filter in question performs a transformation based upon the availability of a certain number N of pixels for each component of luminance and chrominance of the image. These pixels are multiplied by appropriate weights, and the results are accumulated and divided by the sum of said weights. Finally, some of the pixels are not transmitted in the resulting image, depending upon the mutation factor of the chosen resolution.

Starting from an encoded bitstream with arbitrary bitrate B1, it is always possible to obtain an encoded bitstream with bitrate B2 by simply connecting the output of the decoder 50 to the input of the change-of-resolution block 60. The output from the latter is then connected to the input of the encoder 70 programmed to encode at an Mbit/s bitrate B2.

The signal that has undergone change of resolution in the module 60 is then fed to an MPEG encoder 70 which is able to generate a syntax in conformance with the MPEG 2 standard or MPEG 4 standard in view of the transmission schematically represented in T.

Finally, downstream of transmission (it is to be recalled that, for the purposes of the present invention, here the term "transmission" also includes recording on a physical medium, such as a DVD) the MPEG (re)encoded signal is fed to a decoder 90 which is able to read and decode the bitstream received according to a syntax in conformance with the MPEG standard (either MPEG 2 or MPEG 4) and with a resolution (Hor/N)×(Vert/M), in view of the generation of an output video sequence OS.

If the block diagrams of FIGS. 1 and 2 are borne in mind, it will be immediately realized that the sequence of processes illustrated in FIG. 3 presents a decidedly high computational complexity.

If the block diagrams of FIGS. 1 and 2 are borne in mind, it will be immediately realized that the sequence of processes illustrated in FIG. 3 presents a decidedly high computational complexity.

The transcoding operation represented in the diagram of FIG. 3 entails, in fact, as far as the decoder 50 is concerned, the execution of the following steps:
 inverse Huffman coding;
 inverse Run-Length coding;
 inverse quantization;
 inverse discrete cosine transform;
 motocompensation;
 filtering; and
 change of resolution (where envisaged).

For the encoder 70, the following operations become necessary:
 pre-processing;
 estimation of motion;
 calculation of prediction error;
 cosine transform;
 quantization;
 run-length coding;
 Huffman coding;
 inverse quantization;
 inverse discrete cosine transform; and
 motocompensation.

Finally, for the receiving decoder, the following operations must be carried out:
 inverse Huffman coding;
 inverse run-length coding;
 inverse quantization;
 inverse discrete cosine transform; and
 motocompensation.

The computational cost lies almost entirely in the estimation of motion, followed by the direct and inverse cosine transforms and motocompensation. Quantization and the (direct and inverse) run-length and Huffman codings constitute, instead, a contribution smaller than the previous ones to the overall cost.

The quality of the resulting output bitstream OS derives, instead, from the information content of the quantized coefficients. This depends upon the implementation of the encoder (the decoder is uniquely defined by ISO/IEC 13818-2 Directives for the MPEG 2 standard and by ISO/IEC 14496-2 Directives for the MPEG 4 standard), upon the effectiveness of its estimator of motion, and upon the quality and precision of the rate control.

A solution on the whole similar to the one described above with reference to FIG. 3 is illustrated in U.S. Pat. No. 6,005,621. In particular, this document describes a method for explicit transcoding which envisages complete decoding of an input bitstream, scaling of the images, and subsequent encoding of a number of output bitstreams with different resolutions by means of a technique of hierarchical estimation of motion in the spatial domain.

BRIEF SUMMARY OF THE INVENTION

Aspects of the present invention provide a solution that is capable of enabling change of resolution of an MPEG bitstream without having to resort to the extremely burdensome solution illustrated previously.

Aspects of the invention also regard the corresponding system (which can be implemented, for example, in the form of a dedicated processor, such as a DSP), as well as the corresponding computer program product, namely, the set of program codes which may be loaded in the memory of a digital processor, in particular of the general-purpose type, and which may enable the processor in question to carry out the process according to aspects of the invention.

Basically, the solution according to aspects of the invention envisages the merging of a decoder with an encoder in an ensemble designed specifically for variation or else conservation of the bitrate of a bitstream.

The solution according to aspects of the invention enables reduction in computational complexity and an improvement or conservation of the quality of the output signal with respect to the input signal.

The solution according to aspects of the invention makes it possible to achieve dynamic re-adaptation of the resolution of compressed images in a bitstream encoded according to the MPEG standard with a high-quality result and with the possibility of using system architectures that are optimized in terms of storage capacity thanks to recourse to structures based upon multipliers that implement the inverse-quantization function and the filters. This applies in particular to the possibility of using the multiplying structure designed to implement inverse quantization also for the filtering required by the range of resolution.

The solution according to aspects of the invention basically performs filtering in the domain of the discrete cosine transform (DCT) instead of in the pixel domain. This is perfectly legitimate in so far as DC transformation and the convolution operation (which lies at the basis of filtering) are linear operations, and hence interchangeable in order of execution. The fact that filtering is performed in the DCT domain implies the availability of the decompressed image in said domain, hence the availability of the motocompensation operation in compliance with the MPEG specification.

The solution according to aspects of the invention therefore provides a method alternative to "explicit" decoding and re-encoding of the type described previously with reference to FIG. 3.

The solution according to aspects of the invention operates directly in the DCT-encoded domain, at a considerably lower computational cost, at the same time enabling not only regeneration of a bitstream containing a reduced-resolution image, but also the possible viewing of the images on which change of resolution is taking place, precisely at the moment at which the said change is occurring. This option enables the user to examine the quality obtained instant by instant, in order to intervene, if need be, on said quality.

The solution according to aspects of the invention thus presents two main strong points:

- it avoids the need, when changing resolution, to (re)estimate the motion; the solution according to aspects of the invention in fact re-uses information of the input bitstream to generate the output bitstream; and
- it avoids the need, when changing resolution, to cascade a DCT function and its inverse function IDCT, since the solution according to aspects of the invention operates entirely in the frequency domain.

In the solution according to aspects of the invention, the portions of bitstream that do not significantly affect reduction of the bitrate are not processed, but simply translated according to the syntax and resolution of the target standard. The motion vectors are appropriately filtered by means of a transformation based upon the availability of a certain number M of motion vectors associated to the macroblocks which are to be merged into the new macroblock, or else surround those that are to be merged into the new macroblock. The motion vectors are multiplied by appropriate weights, and the results are accumulated and divided by the sum of the weights. In fact, the motion field must be appropriately scaled to be associated to the pixel macroblocks that characterize the target resolution.

The portions of the bitstream that significantly affect the reduction in bitrate are basically the DCT coefficients. In particular, the DCT coefficients undergo the following processing operations:

inverse variable-length coding (VLC);
inverse quantization (Q); and
motocompensation and storage.

Other features and advantages of the invention will become apparent from the following detailed description, taken in conjunction with the accompanying drawings.

BRIEF DESCRIPTION OF THE SEVERAL VIEWS OF THE DRAWING(S)

An embodiment of the invention will now be described, purely by way of non-limiting example, with reference to the attached drawings, in which:

FIGS. 1 to 3, which regard the prior art, have already been extensively described previously;

DETAILED DESCRIPTION OF THE INVENTION

Figure 4:
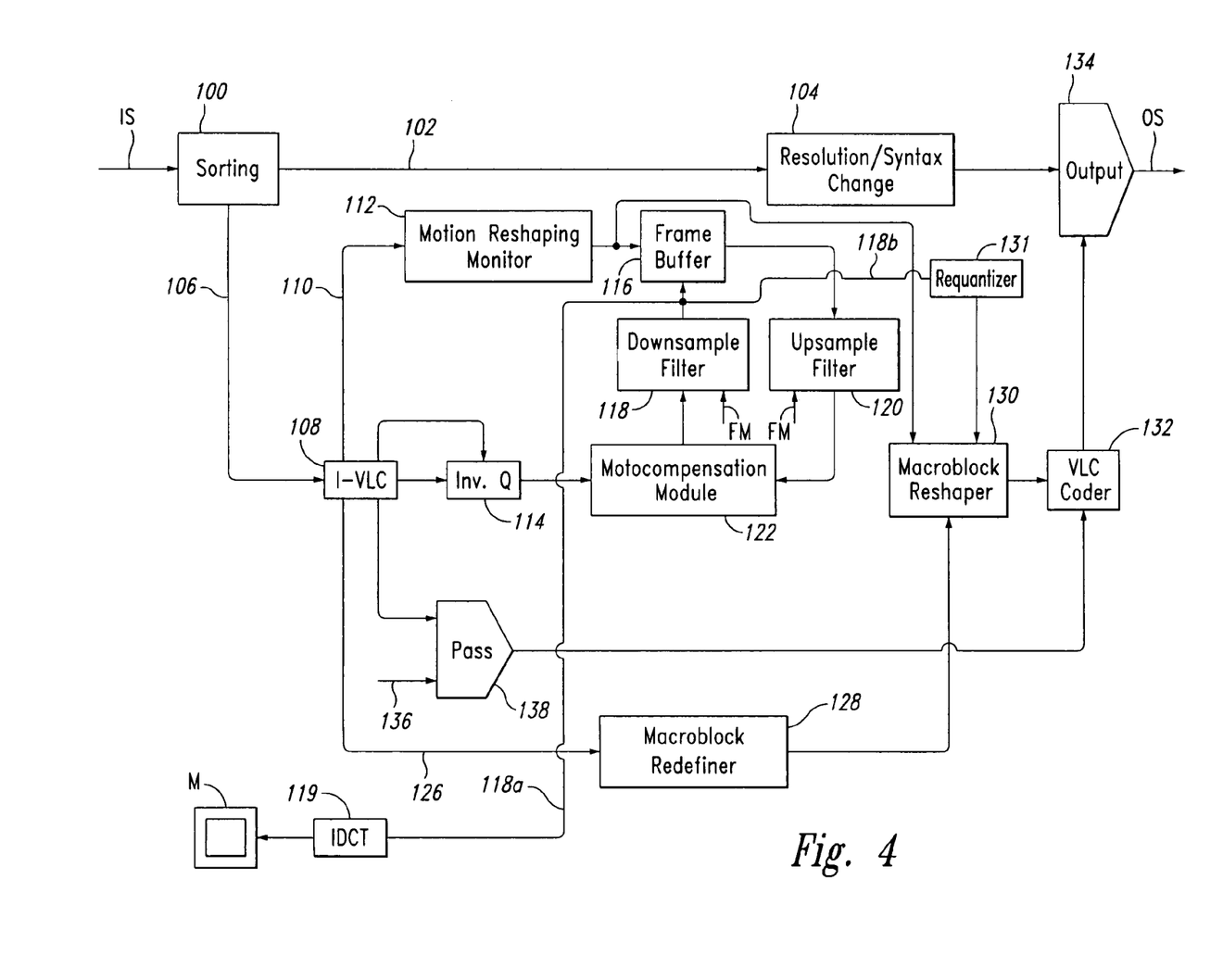
FIG. 4 illustrates, in the form of a block diagram, an embodiment of the solution according to the invention.

Basically, the purpose pursued by the solution illustrated in FIG. 4 is to start from an input bitstream IS (whether MPEG 2 or MPEG 4) and to generate, starting therefrom, an output bitstream OS (again, either MPEG 2 or MPEG 4, according to the requirements), with the possibility of effecting, in addition to the change of resolution, also a change of syntax and/or bitrate.

It will, on the other hand, be appreciated that it is by no means imperative to make all three of the above changes simultaneously. Consequently, even though with reference to FIG. 4 a solution will be described that is able to perform all three changes in question, an embodiment of the solution according to the invention is suitable for being applied in contexts in which the only change made is the change of resolution.

The input bitstream IS is fed from a sorting module 100, which performs a function of parsing of the headers. This function basically aims at distinguishing the portions of the bitstream that are not useful for the purposes of reducing the resolution from the portions which, instead, are useful for this purpose (basically, the DCT coefficients).

The former portions of bitstream are sent, through a line 102, to a module 104 which carries out the function of change of resolution and syntax by accessing the syntax fields which store the aforesaid values and by changing their binary coding into the values corresponding to the target resolution and bitrate.

The latter portions of the bitstream (the ones useful for the purpose of reducing the resolution) are, instead, sent along a line 106 to a block 108 which basically carries out the inverse VLC transform.

In particular, the motion vectors that derive from this operation are sent back, on a line 110, to a block 112, which monitors the function of reshaping of the motion vectors. This is basically a transformation based upon the availability of a certain number M of motion vectors associated to the macroblocks that are to be merged into the new macroblock or surround those that are to be merged into the new macroblock. The motion field must be appropriately scaled to enable the association of pixels that characterize the target resolution to the macroblocks.

Downstream of the module 108, there is also performed, in a module 114, the inverse-quantization function (IQ).

At output from the module 114 it is possible to obtain:
the decoded frame (half-frame) I, in the DCT domain, which is to be stored in a frame memory so that it can then contribute to restoring temporal redundancy to subsequent images P and B according to the motocompensation process described in the MPEG standard; and
the decoded prediction error frame (half-frame) P and B, in the DCT domain, which is to be added to the information previously removed during the step of estimation of motion; in the P case, this resulting sum, with respect to the preceding I or P, is stored in an appropriate frame memory and is then used during the process of compensation of motion for the subsequent images P and B.

More precisely, storage takes place in a memory block 116 having the function of a frame buffer connected at input both to the output of the module 112 and to the output of a module 118 which performs (according to criteria which will be better described in what follows) the function of a horizontal and vertical downsampling filter. The output of the buffer 116 constitutes the input of a further module 120 designed to perform a horizontal and vertical upsampling filtering function, which is complementary to the function performed by the filter 118.

Both the filter 118 and the filter 120 operate according to filtering matrices applied on the respective inputs designated by FM.

The output of the module 120 (which in practice constitutes the prediction signal of the motocompensation process) is sent to a corresponding motocompensation module 122, which also receives the signal at output from the module 114.

The output signal of the module 122 constitutes, precisely, the input of the filter 118.

More specifically, the inverse oversampling function represented by the filter 120 is supplied by the blocks read by the frame memory 116 and is addressed by the vectors obtained at output from the block 112. The data thus oversampled are sent to the motocompensation unit represented by the block 122.

It will be appreciated that the motocompensated images obtained according to the aforesaid criterion have the same resolution Hor×Vert as the input signal. They are not, however, stored in the module 116 with this resolution, but rather with the resolution obtained downstream of the block 118 that performs horizontal and vertical filtering in the DCT domain.

The latter resolution is precisely the one resulting from the downsampling function, namely (Hor/N)×(Vert/M), with corresponding dimensions in the storage module 116. In particular, this storage module may have dimensions [(Hor/N)×(Vert/M)×1.5×1.5×2] for storing two frames with a precision of 12 bits per coefficient in the DCT domain and in format 420, which are useful for the motocompensation process.

The signal subjected to reduction in resolution at output from the filter 118 can be sent, along a line 118a, to a module 119 which carries out the inverse DCT (IDCT) function, in such a way as to render visible, for example on a monitor M, the images on which change of resolution is taking place. This can be done exactly at the moment when the change is occurring: the user of the system can thus inspect the quality obtained instant by instant so as to be able to intervene, if need be, on the process of change of resolution, basically via the matrices FM.

The reference number 126 designates, instead, a further line on which the results deriving from the inverse VLC coding operation are sent to a module 128, which basically superintends a redefinition of the macroblock parameters according to the modalities described in greater detail in what follows.

The aim of the foregoing is to arrive, in the module designated as a whole by 130, at an action of reshaping of the macroblocks, which, after a prior new VLC coding, performed in the module designated by 132, are sent back to an output node 134 in which the portions of bitstream originally switched on the line 102 and on the line 106 are again recombined together so as to generate the output bitstream OS.

In particular, the block 130 operates on the basis of the signal generated by the module 112 which superintends reshaping of the motion vectors. The foregoing is done according to the signal coming from a module 131, which performs the function of re-quantization of the modified-resolution signal received on a line 118a from the filter 118.

It will be noted that the inverse VLC decoding operation performed in the module 108 and the (new) VLC coding operation performed in the module 132 are in fact linked together to take into account the MPEG 2 and MPEG 4 standards involved (respectively at input and at output). The aforesaid modules receive at input also the weighting matrices, which may possibly be defined by the user and introduced into the system on a line 136 and used by a module 138.

In order to make the change of resolution, an embodiment of the solution according to the invention then proceeds to a filtering in the DCT domain. This takes place according to the modalities illustrated in greater detail in FIGS. 5 and 6.

Figure 5:
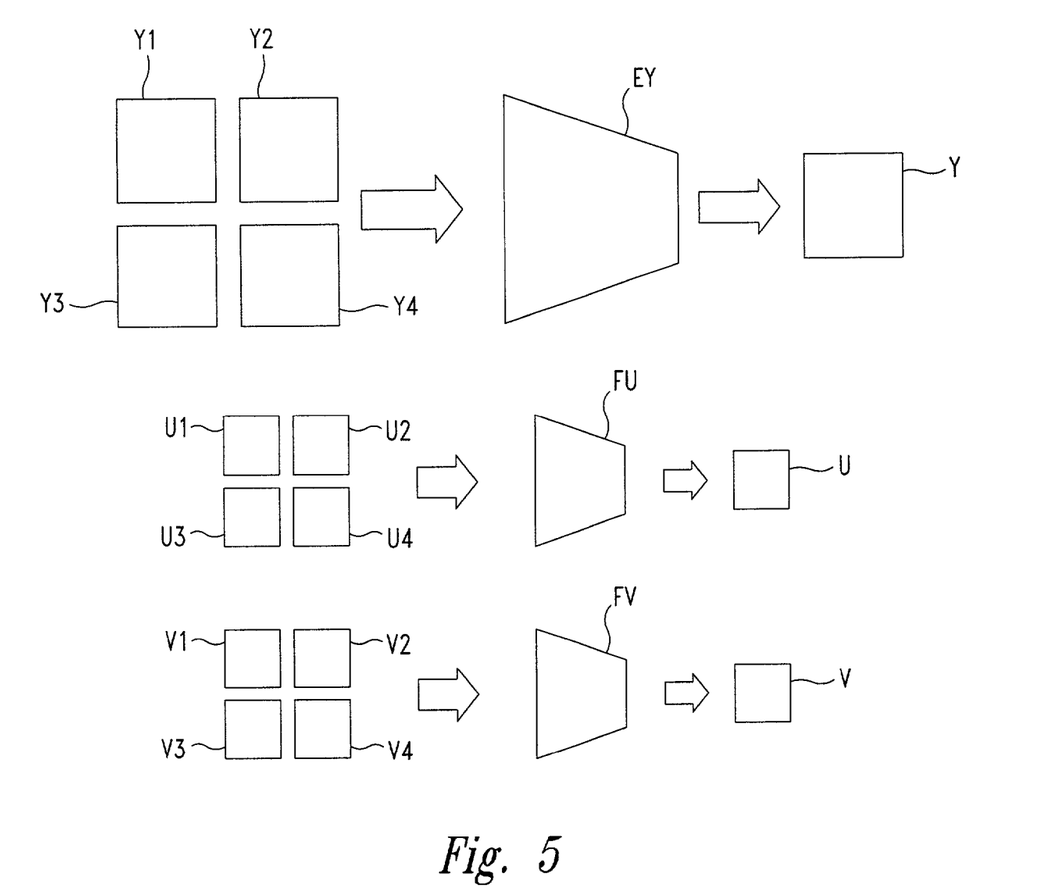
FIG. 5, illustrates one embodiment of the present invention, having components a), b), and c)

Of course it is to be recalled that, as has already been said previously, the functional-block representation provided by FIG. 5 corresponds to processing operations that may be carried out using both dedicated processors and general-purpose processors that are adequately programmed (in a way of itself known, once the functional specifications that it is intended to adopt are known).

The part a) of FIG. 5 shows, for example, how from four luminance macroblocks (each consisting of 16×16 pixels) designated by Y1 to Y4 just one is extracted EY, designated by Y, in the case of a subsampling factor equal to 2.

The parts of FIG. 5 designated by b) and c) show, instead, that, for the chrominance component, respectively U and V 4:2:0 it is necessary to have available four 8×8 blocks designated by U1 to U4 and V1 to V4 to merge them, FU and FV, into a single block, designated by U or V, by means of filtering.

Figure 6:
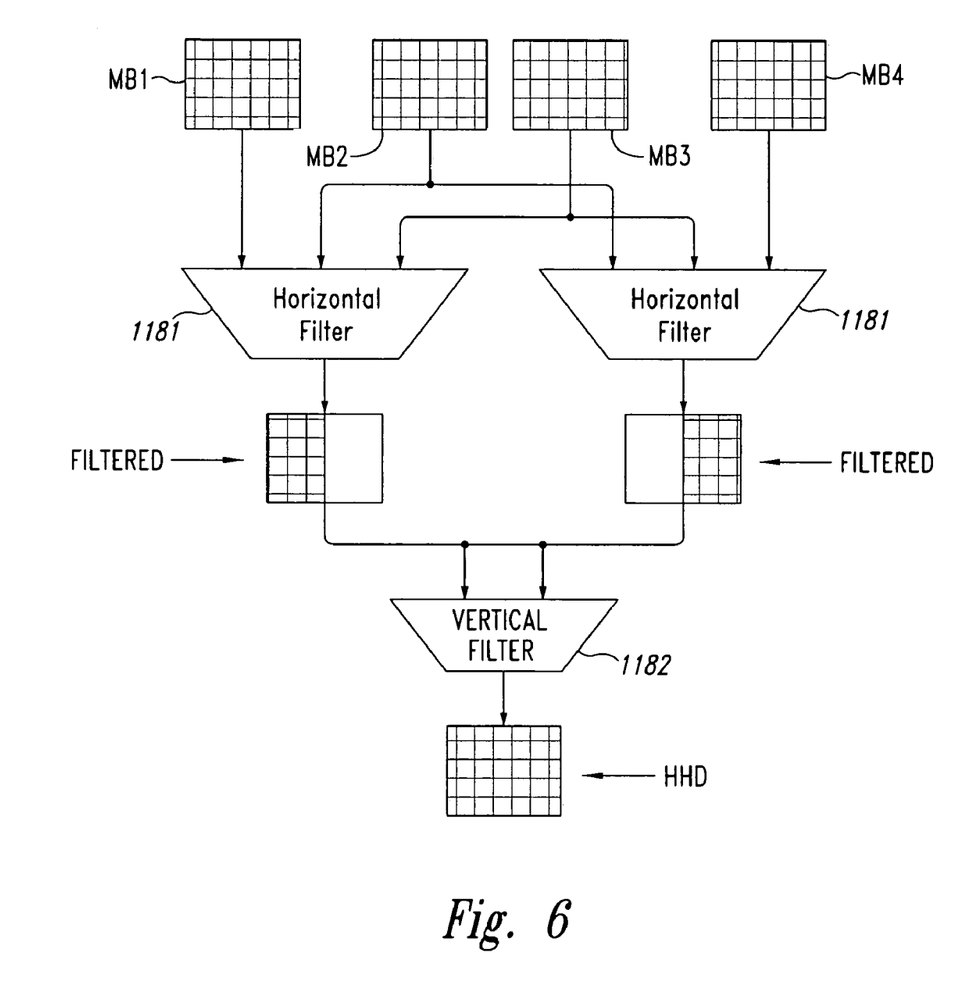
FIG. 6 illustrates one embodiment of a solution according to the invention in greater detail.

The filtering operation is then based upon steps illustrated in FIG. 6.

In particular, if a certain number of 8×8 MPEG blocks arranged on one and the same horizontal line of a local buffer are designated by MB1 to MB4, these are made available in a number of at least three to the horizontal filter 1181 comprised in the module 118 in FIG. 4. This implements the multiplication of the above-mentioned macroblocks by an appropriate number of matrices of size H×V, thus obtaining a new set with halved horizontal definition (HDD).

The blocks thus generated are stored and arranged on the same vertical line of a second local buffer so as to make at least three of them available to the vertical filter 1182 comprised in the module 118 in FIG. 4. This multiplies the macroblocks by an appropriate number of matrices having size H×V, thus obtaining a new set with halved vertical definition.

In this way, the equivalent macroblock (shown in the right-hand part of FIG. 5) can be sent to the module 116, to the module 119 that implements the inverse cosine transform for complete decoding of the images (in this way making the images simultaneously available to the transcoded bitstream), and to the module 131, which, when it receives the macroblock filtered by the module 118, re-quantizes it according to the quantization parameter obtained at output from the block 128. The result is then sent to the block 130.

The block 130 receives the data from the block 112, the module 131, and the module 128 so as to generate the new macroblock, which is sent to the module 132. The data thus obtained are multiplexed in 134 with the data coming from the module 104.

In 128, the values of the parameters quantizer_scale_code and quantizer_scale_type are redefined.

As far as the former parameter is concerned, the following alternatives are possible:
  re-using the one present in the input bitstream IS; and
  calculating the weighted mean value for appropriate coefficients, the minimum value, the median value, or else the maximum value of N quantizer_scale_code values associated to the macroblocks present in the input bitstream, the said macroblocks being the ones that supply the block 118.

It will be appreciated that the main advantage of an embodiment of the solution according to the present invention derives, in terms of computational gain, from the elimination of the motocompensation, estimate of motion, and inverse and direct cosine transform blocks.

Of course, without prejudice to the principle of the invention, the details of implementation and the embodiments may vary widely with respect to what is described and illustrated herein, without thereby departing from the scope of the present invention as defined in the annexed claims.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A process for generating an MPEG output bitstream from an MPEG input bitstream having a first resolution, said MPEG output bitstream having a second resolution modified with respect to the first resolution of said MPEG input bitstream, the process comprising the operations of:
  distinguishing, in said MPEG input bitstream, first portions that substantially do not affect and second portions that substantially do affect variation of the resolution of the MPEG output bitstream;
  subjecting said second portions of the input bitstream to an inverse-quantization operation to obtain inverse-quantized second portions of the first resolution;
  subjecting said inverse-quantized second portions of the first resolution to motion compensation in a DCT domain to obtain motion-compensated second portions of the first resolution;
  subjecting said motion-compensated second portions to a first operation of modification of the resolution by filtering said motion-compensated second portions in a discrete cosine transform domain to obtain resolution-modified second portions in the second resolution, wherein said filtering operation in the domain of the discrete cosine transform includes the operations of:
    storing a given number of macroblocks aligned on one and the same line; and
    multiplying said macroblocks by at least one matrix with a scaled factor of definition, wherein the multiplying operation comprises:
      multiplying a first subset of macroblocks of said given number of macroblocks by a first matrix with a factor of definition that is reduced in a first direction to obtain a first macroblock having the factor of definition that is reduced in the first direction;
      multiplying a second subset of macroblocks of said given number of macroblocks by a second matrix with the factor of definition that is reduced in the first direction to obtain a second macroblock the factor of definition that is reduced in the first direction; and
      multiplying the first and second macroblocks by a third matrix with a factor of definition that is reduced in a second direction to obtain a third macroblock;
  storing said resolution-modified second portions; and
  obtaining resolution-remodified second portions by subjecting the stored resolution-modified second portions to a second operation of modification of the resolution that brings back the resolution of the stored data from said second resolution to said first resolution, wherein subjecting said inverse-quantized second portions of the first resolution to motion compensation in the DCT domain includes using the resolution-remodified second portions as a prediction signal when motion compensating said inverse-quantized second portions of the first resolution.

2. The process according to claim 1, further comprising subjecting said resolution-modified second portions to an inverse discrete cosine transform function to generate decompressed data with modified resolution that are perceptible during generation of said output bitstream with modified resolution.

3. The process according to claim 1 wherein said filtering said second portions in the domain of the discrete cosine transform is performed with selectively variable coefficients.

4. The process according to claim 3 wherein said selectively variable coefficients are configured to be selectively variable during generation of said output bitstream with modified resolution.

5. The process according to claim 1, further comprising subjecting said second portions of the input bitstream to an inverse VLC function prior to said inverse-quantization operation.

6. The process according to claim 1 wherein said second resolution is a resolution lower than said first definition.

7. The process according to claim 1, wherein said given number of aligned macroblocks are aligned on one and the same horizontal line, and said definition factor is scaled in the horizontal direction.

8. The process according claim 1 wherein said given number of aligned macroblocks are aligned on one and the same vertical line, and said definition factor is scaled in the vertical direction.

9. The process according to claim 1, further comprising the operation of storing both a given number of macroblocks aligned on a horizontal line and a given number of macroblocks aligned on a vertical line, so that said definition factor is scaled both in the horizontal direction and in the vertical direction.

10. The process according to claim 1 wherein said given number of macroblocks comprises at least three macroblocks.

11. A system for generating an MPEG output bitstream starting from an MPEG input bitstream having a first resolution, said MPEG output bitstream having a second resolution modified with respect to the first resolution of said MPEG input bitstream, the system comprising:
a sorting module configured to distinguish, in said input bitstream, first portions that substantially do not affect and second portions that substantially do affect variation of resolution of the MPEG output bitstream; and
an inverse quantizer module structured to subject said second portions of the input bitstream to an inverse-quantization operation to obtain inverse-quantized second portions of the first resolution;
a motion compensation module structured to subject said inverse-quantized second portions of the first resolution to motion compensation in a DCT domain to obtain motion-compensated second portions of the first resolution;
at least one processing module configured to subject said motion-compensated second portions to a function of modification of the resolution obtained by filtering said motion-compensated second portions in the discrete cosine transform domain to obtain resolution-modified second portions in the second resolution, wherein said at least one processing module is further configured to:
store a given number of macroblocks aligned on one and the same line; and
multiply said macroblocks by at least one matrix with a scaled factor of definition, wherein the multiplying operation comprises:
multiplying a first subset of macroblocks of said given number of macroblocks by a first matrix with a factor of definition that is reduced in a first direction to obtain a first macroblock having the factor of definition that is reduced in the first direction;
multiplying a second subset of macroblocks of said given number of macroblocks by a second matrix with the factor of definition that is reduced in the first direction to obtain a second macroblock the factor of definition that is reduced in the first direction; and
multiplying the first and second macroblocks by a third matrix with a factor of definition that is reduced in a second direction to obtain a third macroblock;
at least one storage module configured to store said resolution-modified second portions; and
an upsample filter configured to obtain resolution-remodified second portions by subjecting the stored resolution-modified second portions to a second operation of modification of the resolution that brings back the resolution of the stored data from said second resolution to said first resolution, wherein the motion compensation module is structured to obtain the motion-compensated second portions of the first resolution using the resolution-remodified second portions as a prediction signal.

12. The system according to claim 11, further comprising an inverse-transform module configured to subject said resolution-modified second portions to an inverse discrete cosine transform function to generate decompressed data with modified resolution that are perceptible during generation of said output bitstream with modified resolution.

13. The system according to claim 11 wherein said at least one processing module performs said operation of change of resolution via filtering in the domain of the discrete cosine transform with selectively variable coefficients.

14. The system according to claim 13 wherein said at least one processing module is configured in such a way that said coefficients are selectively variable during generation of said output bitstream with modified resolution.

15. The system according to claim 11, further comprising an inverse VLC module configured to subject said second portions of the input bitstream to an inverse VLC function prior to the inverse quantizer module performing said inverse quantization operation.

16. The system according to claim 11 wherein said second resolution is a resolution lower than said first resolution.

17. The system according to claim 11 wherein said given number of aligned macroblocks are aligned on one and the same horizontal line, and in that said definition factor is scaled in the horizontal direction.

18. The system according to claim 11 wherein said given number of aligned macroblocks are aligned on one and the same vertical line, and in that said definition factor is scaled in the vertical direction.

19. The system according to claim 11, further comprising the operation of storing both a given number of macroblocks aligned on a horizontal line and a given number of macroblocks aligned on a vertical line, so that said definition factor is scaled both in the horizontal direction and in the vertical direction.

20. The system according to claim 11 wherein said given number of macroblocks comprises at least three macroblocks.

21. A computer program product directly loadable in the memory of a digital computer and comprising software code portions for causing a computer to generate an output bitstream from an input bitstream having a first resolution, the output bitstream having a second resolution modified with respect to the first resolution of the input bitstream, by:
distinguishing, in the input bitstream, first portions that substantially do not affect and second portions that substantially do affect variation of the resolution of the output bitstream;
subjecting said second portions of the input bitstream to an inverse-quantization operation to obtain inverse-quantized second portions of the first resolution;

subjecting said inverse-quantized second portions of the first resolution to motion compensation in a DCT domain to obtain motion-compensated second portions of the first resolution;

subjecting the motion-compensated second portions to a function of modification of the resolution obtained by filtering the motion-compensated second portions in a discrete cosine transform domain to obtain resolution-modified second portions in the second resolution, wherein the filtering in the domain of the discrete cosine transform includes:

store a given number of macroblocks aligned on one and the same line; and multiply said macroblocks by at least one matrix with a scaled factor of definition, wherein the multiplying operation comprises:

multiplying a first subset of macroblocks of said given number of macroblocks by a first matrix with a factor of definition that is reduced in a first direction to obtain a first macroblock having the factor of definition that is reduced in the first direction;

multiplying a second subset of macroblocks of said given number of macroblocks by a second matrix with the factor of definition that is reduced in the first direction to obtain a second macroblock the factor of definition that is reduced in the first direction; and multiplying the first and second macroblocks by a third matrix with a factor of definition that is reduced in a second direction to obtain a third macroblock;

storing said resolution-modified second portions; and obtaining resolution-remodified second portions by subjecting the stored resolution-modified second portions to a second operation of modification of the resolution that brings back the resolution of the stored data from said second resolution to said first resolution, wherein subjecting said inverse-quantized second portions of the first resolution to motion compensation in the DCT domain includes using the resolution-remodified second portions as a prediction signal when motion compensating said inverse-quantized second portions of the first resolution.

22. The computer program product of claim 21, further comprising software code portions for causing the computer to generate the output bitstream by subjecting the resolution-modified second portions to an inverse discrete cosine transform function to generate decompressed data with modified resolution that are perceptible during generation of the output bitstream with modified resolution.

23. The computer program product of claim 21 wherein the filtering the second portions in the domain of the discrete cosine transform is performed with selectively variable coefficients.

24. The computer program product of claim 23 wherein the selectively variable coefficients are configured to be selectively variable during generation of the output bitstream with modified resolution.

25. The computer program product of claim 21, further comprising software code portions for causing the computer to generate the output bitstream by subjecting the second portions of the input bitstream to an inverse VLC function prior to the inverse-quantization operation being preformed.

26. The computer program product of claim 21 wherein the second resolution is a resolution lower than the first definition.

27. The computer program product of claim 21 wherein the given number of aligned macroblocks are aligned on the same horizontal line, and in that the definition factor is scaled in the horizontal direction.

28. The computer program product of claim 21 wherein the given number of aligned macroblocks are aligned on the same vertical line, and in that the definition factor is scaled in the vertical direction.

29. The computer program product of claim 21, further comprising software code portions for causing the computer to generate the output bitstream by storing both a given number of macroblocks aligned on a horizontal line and a given number of macroblocks aligned on a vertical line, so that the definition factor is scaled both in the horizontal direction and in the vertical direction.

30. The computer program product of claim 21 wherein the given number of macroblocks comprises at least three macroblocks.

31. The method of claim 1, further comprising:

applying to motion vectors associated with said input bitstream a transformation that correlates the motion vectors to a number of motion vectors associated with at least one of a plurality of macroblocks of said output bitstream, wherein said transformation applied to the motion vectors associated with said input bitstream includes:

multiplying said motion vectors by respective weighting factors;

accumulating the results of the above multiplication; and dividing the results accumulated by the sum of said weighting factors.

* * * * *